United States Patent [19]

Amano et al.

[11] Patent Number: 5,449,723

[45] Date of Patent: Sep. 12, 1995

[54] METHOD FOR THE PREPARATION OF A VINYL CHLORIDE-BASED POLYMER

[75] Inventors: Tadashi Amano; Shuji Ohnishi, both of Ibaraki, Japan

[73] Assignee: Shin-Etsu Chemical Co., Ltd., Tokyo, Japan

[21] Appl. No.: 126,378

[22] Filed: Sep. 24, 1993

Related U.S. Application Data

[63] Continuation-in-part of Ser. No. 907,783, Jul. 1, 1992, abandoned.

[30] Foreign Application Priority Data

Jul. 5, 1991 [JP] Japan .................. 3-191032

[51] Int. Cl.[6] ............................................. C08F 14/06
[52] U.S. Cl. .................. 526/67; 526/344.2; 526/345
[58] Field of Search .............. 526/344.2, 67, 68, 69, 526/70, 345

[56] References Cited

U.S. PATENT DOCUMENTS

| | | | |
|---|---|---|---|
| 2,979,492 | 4/1961 | Governale et al. | 526/344.2 |
| 3,004,013 | 10/1961 | Kircher et al. | 526/344.2 |
| 3,926,931 | 12/1975 | Koyanagi et al. | 526/344.2 |
| 4,464,517 | 8/1984 | Makino et al. | 526/344.2 |

Primary Examiner—Joseph L. Schofer
Assistant Examiner—Tom Weber

[57] ABSTRACT

An improvement is proposed in the method for the preparation of a polyvinyl chloride resin by the suspension polymerization of the monomer in a polymerization reactor system comprising a reactor and an external heat exchanger connected to the reactor by a pipe line through a pumping means in order to supplement the deficiency in the cooling capacity of the jacket of the reactor and/or reflux condenser installed thereto when the capacity of the reactor is greatly increased. While such an external circulating circuit using a conventional pump suffers from a serious problem of polymer scale deposition on the inner walls of the circuit and downgrading of the quality of the resin product, these drawbacks can be dissolved by using a specific pump having an impellor in the form of a single spiral screw blade around a hub having a conical configuration to circulate the polymerization mixture through the heat exchanger for the removal of the heat of polymerization, which is started at or after the moment when the temperature of the polymerization mixture in the reactor reaches the predetermined polymerization temperature but before the conversion of the monomer to polymer exceeds 10%.

1 Claim, 1 Drawing Sheet

METHOD FOR THE PREPARATION OF A VINYL CHLORIDE-BASED POLYMER

This is a continuation-in-part patent application from a U.S. patent application Ser. No. 07/907,783 filed Jul. 1st, 1992, now abandoned.

BACKGROUND OF THE INVENTION

The present invention relates to an improvement in the method for the suspension polymerization of vinyl chloride monomer or a monomer mixture mainly consisting of vinyl chloride in an aqueous polymerization medium to produce a polyvinyl chloride resin. More particularly, the invention relates to an improvement in the method for the suspension polymerization of vinyl chloride monomer in a polymerization reactor system comprising an external heat exchanger connected to the reactor by a piping line in which the polymerization mixture is circulated from the bottom of the reactor to the upper part thereof through the said heat exchanger by means of a pump.

It is well known and generally understood that one of the important problems encountered in the suspension polymerization of vinyl chloride monomer in an aqueous medium contained in a polymerization reactor is the efficiency of heat exchange for quickly increasing the temperature of the polymerization mixture up to the polymerization temperature and efficient removal of the heat of polymerization in order to keep the temperature of the polymerization mixture within a narrow range during proceeding of the polymerization reaction. Namely, a conventional procedure for the suspension polymerization of vinyl chloride monomer is conducted by introducing water as the suspension medium, the monomer, polymerization initiator, suspending agent and other optional additives into a polymerization reactor equipped with a jacket for circulating hot water for heating of or cold water for heat removal from the polymerization mixture and a reflux condenser for heat removal. Once the temperature of the polymerization mixture has reached a specified polymerization temperature and the polymerization reaction is started, the temperature thereof is controlled at the specified polymerization temperature by removing the heat of polymerization by means of the jacket and the reflux condenser.

Needless to say, the productivity of the above described process depends on the length of time taken for completing a run of the polymerization reaction including the time for the preparatory step before the start of the polymerization reaction, the time for the polymerization reaction per se and the time for the processing of the polymerizate slurry into a powder product of the resin. The measure undertaken to decrease the time for the polymerization reaction per se is to increase the amount of the polymerization initiator or to use a polymerization initiator having high activity even when the polymerization-temperature is relatively low. Increase in the polymerization velocity by the above mentioned means is possible only with an improvement in the efficiency for the removal of the heat of polyymerization from the polymerization mixture during proceeding of the polymerization reaction.

It is a remarkable trend in recent years in such a process of polymerization that the process is conducted by using a polymerization reactor of a larger and larger capacity in order to enhance the productivity. An increase in the capacity of the reactor necessarily leads to a decrease in the area available for heat removal through the jacket relative to the volume of the reactor or the polymerization mixture. In order to compensate for the deficiency in the capacity of heat removal through the jacket, it is usual that a reflux condenser having a larger cooling capacity is installed to the reactor or, alternatively, the water circulated through the jacket is chilled by means of an additionally installed chilling means so as to increase the efficiency of heat removal.

The former means by increasing the capacity of the reflux condenser has a limitation due to a very difficult problem. When the rate of evaporation from the polymerization mixture and hence the rate of refluxing are increased by the increase in the capacity of the condenser, namely, violent foaming is unavoidably caused on the polymerization mixture eventually to carry over the liquid mixture so that heavy deposition of polymer scale takes place on all over the surface of the reactor and even inside of the reflux condenser resulting in a decrease in the cooling capacity or degradation of the product quality due to an increase in the amount of fish eyes. When such a large reflux condenser is brought into operation, in particular, at the beginning stage of the polymerization reaction, an adverse influence is caused on the particle size distribution of the resin product to contain coarser particles.

The latter means of chilling the cooling water is economically not practical due to the great costs required for installing and running the refrigerating machine. The efficiency of this means is still lower when the polymerization reaction is conducted for the production of a polyvinyl chloride resin having a relatively high average degree of polymerization for which the polymerization temperature must be decreased resulting in a decreased difference between the polymerization temperature and the temperature of the cooling water which can rarely be lower than 30° C. when the cooling water is recirculated through the jacket.

As an alternative means of the above described prior art methods, a proposal has been made in Japanese Patent Kokai No. 54-24991, No. 56-47410 and No. 58-32606 and Japanese Patent Publication No. 64-11642 to provide an external heat exchanger or a cooling means which is connected to the reactor with a piping so as to circulate the polymerization mixture using a pump, typically, from the bottom of and to the upper part of the polymerization reactor through the heat exchanger where the polymerization mixture is cooled. The method using such a reactor system is indeed very effective if the matter concerned is merely to increase the cooling capacity. A serious problem unavoidable in this method, however, is the deposition of polymer scale on the inner walls of the circulation system of the polymerization mixture resulting in a decrease in the cooling capacity and adverse influences on the quality of the resin product. These drawbacks can be avoided by starting running of the external cooling system only at a moment when the monomer conversion into polymer has exceeded a certain limit or by using an external cooling system of a special type with large costs.

SUMMARY OF THE INVENTION

The present invention accordingly has an object to provide an improvement in the method for the suspension polymerization of vinyl chloride monomer or a monomer mixture mainly consisting of vinyl chloride in an aqueous medium to solve the above described problems in the prior art methods using a reactor system having an external heat exchanger through which the polymerization mixture is circulated during proceeding of the polymerization reaction to effect removal of the heat of polymerization.

Thus, the improved method of the invention for the preparation of a vinyl chloride-based resin comprises, using a polymerization reactor system for the suspension polymerization of vinyl chloride or a monomer mixture mainly consisting of vinyl chloride comprising a polymerization reactor, an external heat exchanger for the removal of the heat of polymerization from the polymerization mixture, a pipe line connecting the heat exchanger to the lower part and to the upper part of the polymerization reactor to circulate the polymerization mixture through the heat exchanger and a pumping means to circulate the polymerization mixture from the lower part to the upper part of the reactor through the heat exchanger, starting removal of the heat of polymerization from the polymerization mixture through the external heat exchanger after a moment when the temperature of the polymerization mixture reaches the polymerization temperature but before the moment when the conversion of the monomer to the polymer exceeds 10% by using, as the pumping means, a pump having an impellor in the form of a single spiral screw blade around a hub having a conical configuration.

DETAILED DESCRIPTION OF THE PREFERRED EMBODIMENTS

As is described above, the most characteristic feature of the improvement provided by the present invention consists in that circulation of the polymerization mixture through the external heat exchanger for the removal of the heat of polymerization is started at a specified moment by using a unique and specific pump as defined above as a circulating means of the polymerization mixture in a polymerization reactor system comprising a polymerization reactor and an external heat exchanger connected to the lower part and to the upper part of the reactor by means of a pipe line to circulate the polymerization mixture by means of a unique and specific circulating pump. The inventive method described above is effective in preventing polymer scale deposition on the walls of the circulating pipe line to be freed from the problems of a decrease in the cooling capacity and adverse influences on the quality of the resin product.

In the following, the improved method of the invention is described in more detail with reference to the accompanying drawing.

Figure 1:
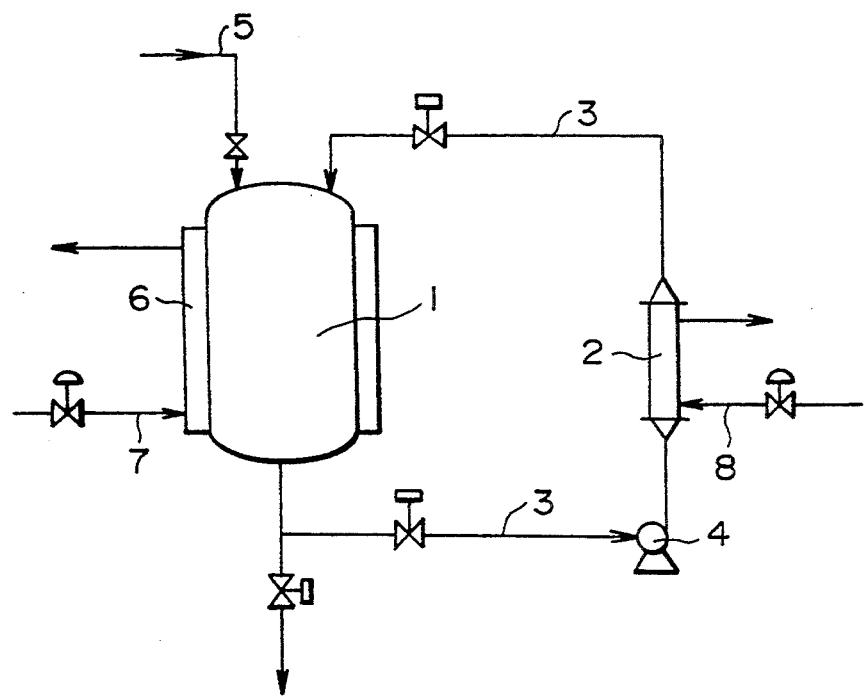
FIG. 1 is a schematic illustration of the flow diagram of the reactor system used in practicing the method of the present invention.

FIG. 1 of the drawing is a schematic illustration of the polymerization reactor system, in which the polymerization reactor 1 having a jacket 6 is connected at the bottom to the inlet of a heat exchanger 2 with a pipe line 3 through a circulating pump 4 while the outlet of the heat exchanger 2 is connected with a pipe line 3 to the top of the polymerization reactor 2. The jacket 6 and heat exchanger 2 are provided with pipe lines 7 and 8, respectively, for the supply of a heating or cooling medium. The polymerization mixture contained in the reactor 1 consisting of an aqueous medium, monomer or monomer mixture, suspending agent, monomer-soluble polymerization initiator and other optional ingredients introduced into the reactor 1 through the pipe line 5 is circulated from the bottom or lower part of the reactor 1 through the heat exchanger 2, where the polymerization mixture is cooled, to the top or upper part of the reactor 1 by means of the circulating pump 4. Although FIG. 1 is depicted in such a fashion that the polymerization mixture circulated through the external heat exchanger 2 by means of the pump 4 is abstracted from the reactor 1 at the bottom and returned to the reactor 1 at the top, the position at which the mixture is abstracted can be somewhat higher than the bottom and the position at which the mixture is returned to the reactor 1 is not limited to the top thereof provided that the position is substantially higher than the position at which the polymerization mixture is abstracted.

According to the investigations undertaken by the inventors, the design or structure of the circulating pump 4 is largely responsible for the polymer scale deposition on the walls of the circulation circuit. In such a polymerization reactor system, the aqueous suspension as the polymerization mixture containing monomer droplets and already formed particles of the resin is abstracted from the lower part of the reactor 1 by means of the circulating pump 4 which is, for example, a centrifugal pump for slurry transfer in which the monomer droplets and resin particles are subjected to a strong shearing force by the impellors of the pump 4 so as to be finely comminuted. The thus formed extremely fine resin particles not only are readily deposited on the walls of the circulation circuit as polymer scale but also necessarily enter the resin product to cause downgrading of the resin product.

Directing their attention to the above mentioned phenomenon of breakdown of the monomer droplets and resin particles, the inventors got an idea that the above described problems could be solved by an appropriate selection of the circulating pump not to cause such a phenomenon of breakdown. Accordingly, the inventors have conducted extensive investigations by using various types of conventional pumps including centrifugal pumps, gear pumps, screw pumps and the like. As a result of the investigations, the inventors have reached an unexpected discovery that the problems can be solved by using a pump having a impellor in the form of a single spiral screw blade around a hub having a conical configuration for the circulation of the polymerization mixture through the heat exchanger, which typically has a structure as illustrated in FIG. 2 by an axial cross section.

Figure 2:
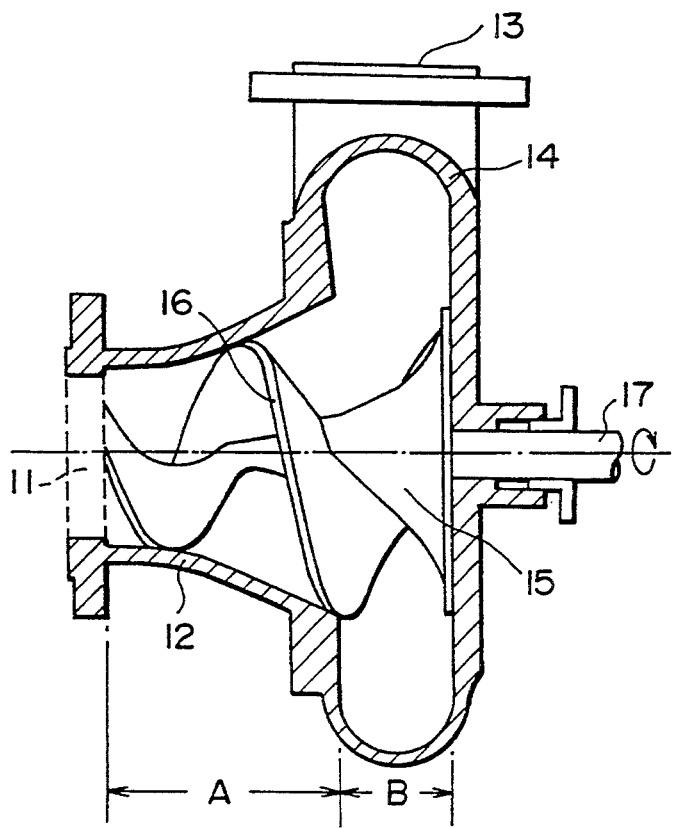
FIG. 2 is an axial cross sectional view of the pump for the circulation of the polymerization mixture.

As is illustrated in FIG. 2, the pump has a pump casing 12 in the form of a truncated cone having a suction port 11 and a discharge port 13 for the polymerization mixture and a scroll-chamber casing 14 is conjoinedly provided to the pump casing 12. The impellor means of the pump consists of a cone-shaped hub 15 rotatable around the shaft 17 and a single impellor blade 16 in the form of a spiral screw blade fixed to the cone-shaped hub 15. The pump as a whole can be divided into a screw-action part A and a centrifuge-action part B. A pump of this type is commercially available in the tradename of, for example, Hydrostal Pump manufactured and sold by Taiheiyo Kinzoku Co.

When the impellor blade 16 is rotating, the impellor blade 16 having a form of a single spiral screw in the pump casing 12 acts something like a volume pump while the flow of the polymerization mixture therethrough is not turbulent by virtue of the steady running of the single blade not to cause gas separation by the centrifugal force so that the monomer droplets and resin particles are not comminuted despite the strong suction force. The spiral blade 16 in the pump casing 12 having a form of truncated cone has a diameter increasing toward the casing 14 of the scroll chamber so as to ensure smooth flow of the polymerization mixture along the outer periphery thereof with a gradually increasing circumferential velocity. The polymerization mixture can be discharged out of the discharge port 13 at a sufficiently high discharge pressure because the casing 14 of the scroll chamber has an annular form to exhibit a centrifugal force as in centrifugal pumps.

When a pump having the above described characteristics is used as a circulating pump according to the invention, polymer scale deposition in the circulating circuit can be effectively avoided as a consequence of effective prevention of breakdown of the monomer droplets and resin particles by the impellor blade so that the efficiency of removal of the heat of polymerization from the polymerization mixture can be greatly increased or is never decreased even without using a refrigerating machine or other expensive means in addition to the improvement of the quality of the resin product.

The present invention is applicable to the polymerization reactor of any types having a jacket and equipped with a stirrer, reflux condenser, baffle and the like. The type of the stirrer is also not particularly limitative including those of the paddle type, Phaudler type, Bullmargin type, propellor type, turbine blade type and the like as combined, according to need, with one or more of baffles in the form of a plate, cylinder, hairpin coil and the like.

The type of the heat exchanger is also not limited to a specific type but can be any of conventional heat exchangers including those of the multitubular type, coil type, spiral type, trombone cooler type and the like. The cooling medium can be cold water, brine and the like. It is also optional to use a jacketed pipe for the pipe line 3 so as to utilize the space between the double walls of the jacketed pipe as the passage way for the cooling medium.

The heat exchanger 2, pipe line 3 and circulating pump 4 as well as valves and other parts coming into contact with the polymerization mixture should preferably be made from a material having resistance against corrosion and good heat conductivity. Examples of suitable materials include various grades of stainless steels such as the 18-8 austenitic, 13-chromium ferritic, martensitic, 18-chromium ferritic, high-chromium ferritic and binary-phase austenitic-ferritic ones. It is optional that the wall surface of these parts is coated With a scale deposition inhibitor or the polymerization mixture is admixed with a scale deposition inhibitor.

It is important that the heat exchanger 2 and circulating pipe 3 have such an internal structure or are in such an arrangement as to be free from stagnancy of the polymerization mixture flowing therethrough. In this regard, it is preferable that the flowing linear velocity of the polymerization mixture is kept in the range from 0.7 to 5.0 meters/second or, more preferably, from 1.0 to 3.0 meters/second at any part of the circulating circuit since deposition of polymer scale may take place when the flowing velocity is too low. The above mentioned upper limit of the flowing velocity is given merely in consideration of the economical disadvantage for the excessively large power consumption without any further improvement.

The improved method of the present invention can be applied not only to the homopolymerization of vinyl chloride alone but also to the copolymerization of a monomer mixture mainly consisting of vinyl chloride with one or more of comohomers copolymerizable with vinyl chloride provided that the major portion or, for example, 50% by weight or larger of the monomer mixture is vinyl chloride. Examples of the comohomers copolymerizable with vinyl chloride include $\alpha$-olefins such as ethylene, propylene, 1-butene, 1-pentene, 1-hexene, 1-heptene, 1-octene, 1-nonene, 1-decene, 1-undecene, 1-dodecene, 1-tridecene and 1-tetradecene, acrylic acid and esters thereof such as methyl acrylate and ethyl acrylate, methacrylic acid and esters thereof such as methyl methacrylate, maleic acid and esters thereof, vinyl esters such as vinyl acetate and vinyl propionate, vinyl ethers such as lauryl vinyl ether and isobutyl vinyl ether, maleic anhydride, acrylonitrile, styrene and vinylidene chloride.

As is the case in the conventional suspension polymerization of vinyl chloride monomer, the polymerization initiator used in the inventive method is a monomer-soluble one exemplified by perester compounds such as tert-butylperoxy neodecanoate, tert-butylperoxy pivalate, tert-hexylperoxy neodecanoate, tert-hexylperoxy neohexanoate, tert-hexylperoxy pivalate, $\alpha$-cumylperoxy neodecanoate, 2,4,4-trimethylpentyl-2-peroxy 2-neodecanoate and the like, percarbonate compounds such as diisopropylperoxy dicarbonate, di-2-ethoxyethylperoxy dicarbonate, di-2-ethylhexylperoxy dicarbonate, dimethoxyisopropylperoxy dicarbonate, diethoxyethylperoxy dicarbonate and the like, organic peroxides such as decanoyl peroxide, benzoyl peroxide, cumene hydroperoxide, cyclohexartone peroxide, 2,4-dichlorobenzoyl peroxide, p-menthane hydroperoxide, isobutyryl peroxide, acetyl cyclohexyl sulfonyl peroxide, 2,4,4-trimethylpentyl-2-peroxy phenoxy acetate, 3,5,5-trimethylhexanoyl peroxide, lauroyl peroxide and the like, azo compounds such as $\alpha,\alpha'$-azobisisobutyronitrile, $\alpha,\alpha'$-azobis(2,4-dimethylvaleronitrile), $\alpha,\alpha'$-azobis(4-methoxy-2,4-dimethylvaleronitrile) and the like, and so on. These monomer-soluble polymerization initiators can be used either singly or as a combination of two kinds or more according to need. Further, it is optional to use these monomer soluble polymerization initiators in combination with a monomer-insoluble or water-soluble polymerization initiator such as potassium persulfate, ammonium persulfate, hydrogen peroxide and the like.

The amount of the monomer-soluble polymerization initiator added to the polymerization mixture is in the range from 0.12 to 0.60 part by weight or, preferably, from 0.15 to 0.40 part by weight per 100 parts by weight of the vinyl chloride monomer or a monomer mixture mainly consisting of vinyl chloride. When the amount thereof is too small, an unduly long time is taken for completion of a run of the polymerization procedure due to a decrease in the velocity of the polymerization reaction while, when the amount thereof is too large, the polyvinyl chloride resin product obtained by the polymerization would sometimes be downgraded due to coloration if not to mention the difficulty in the removal of the heat of polymerization due to the unduly increased velocity of the polymerization reaction. The polymerization initiator is introduced into the polymerization reactor separately during or after completion of introduction of water as the suspension medium or the monomer into the reactor or, alternatively, as dissolved beforehand in the vinyl chloride monomer. A preferable method is that the polymerization initiator is emulsified in a small volume of water and the aqueous emulsion is introduced into the reactor so that the polymerization initiator can be rapidly dispersed into the polymerization mixture.

The polymerization mixture according to the inventive method contains a dispersing agent to ensure stability of the suspension of the monomer droplets in the aqueous medium. The dispersing agent is a water-soluble polymeric compound exemplified by synthetic, semi-synthetic and natural polymers including partially saponified polyvinyl alcohols, water-soluble cellulose derivatives, e.g., methyl cellulose, ethyl cellulose, hydroxyethyl cellulose, hydroxypropyl cellulose, hydroxypropyl methyl cellulose and the like, poly(acrylic acid), copolymers of vinyl acetate and maleic anhydride, poly(vinyl pyrrolidone), gelatin and so on. Other dispersing agents, which can be used in combination with the above mentioned water-soluble polymers according to need, include fine inorganic powders such as calcium carbonate, hydroxy apatite and the like, non-ionic surface active agents such as sorbitan monolaurate, sorbitan trioleate, polyoxyethyleneglycol alkyl ethers and the like and artionic surface active agents such as sodium lauryl sulfate, sodium dodecylbenzene sulfonate, sodium dioctyl sulfosuccinate and the like. The amount of the dispersing agent added to the polymerization mixture is in the range from 0.005 to 5.0 parts by weight or, preferably, from 0.01 to 1.0 part by weight per 100 parts by weight of the monomer or monomer mixture.

The conditions under which the polymerization reaction is conducted to practice the present invention can be conventional, excepting the requirements for the use of the externmal heat exchanger, including the proportion of the aqueous medium and the monomer, amounts of the dispersing agent and polymerization initiator, method for introducing these materials into the reactor and so on. It is of course optional that the polymerization mixture is admixed according to need with various kinds of additives conventionally used in the suspension polymerization of vinyl chloride such as polymerization regulators, chain transfer agents, pH controlling agents, gelation improvers, antistatic agents, crosslinking agents, stabilizers, fillers, antioxidants, buffering agents, scale deposition inhibitors and the like. The amount of water as the aqueous medium forming the polymerization mixture is usually in the range from 50 to 300 parts by weight per 100 parts by weight of the vinyl chloride monomer or monomer mixture.

Following is a brief description of the procedure for practicing the method of the present invention by making reference to FIG. 1 of the accompanying drawing. In the first place, the polymerization reactor 1 is charged with water as the aqueous suspension medium, a dispersing agent, the monomer and a polymerization initiator to form a polymerization mixture and hot water is circulated through the jacket 6 of the reactor 1 so as to start elevation of the temperature of the polymerization mixture under agitation. It is optional that hot water is circulated also through the heat exchanger 2 from the pipe line 8 along with circulation of the polymerization mixture in the reactor 1 through the heat exchanger 2 via the pipe line 3 by means of the pump 4 so as to accelerate the temperature elevation of the polymerization mixture until the temperature of the polymerization mixture reaches a predetermined polymerization temperature.

At the moment when the temperature of the polymerization mixture has reached the predetermined polymerization temperature after termination of circulation of hot water through the jacket 6 of the reactor 1 and through the heat exchanger 2, circulation of cooling water is started through the jacket 6 of the reactor 1 so as to maintain the polymerization mixture at the polymerization temperature by adequately removing the heat of polymerization. It is essential in the method of the present invention that circulation of cooling water through the heat exchanger 2 is started under continued circulation of the polymerization mixture through the heat exchanger 2 via the pipe line 3 at or after the moment when the temperature of the polymerization mixture in the reactor 1 reaches the polymerization temperature but before the moment when the conversion of the monomer to the polymer exceeds 10% at the latest so as to effect additional removal of the heat of polymerization. Preferably, the heat exchanger 2 is brought into cooling operation at the moment when the temperature of the polymerization mixture in the reactor 1 just reaches the polymerization temperature so that the desired effect of reducing the polymerization time can be the largest.

The polymerization temperature in the inventive method is in the range from 30° to 80° C. but, usually, in the range from 50° to 65° C. when a polyvinyl chloride resin product to be obtained should have an average degree of polymerization in the range from 600 to 1300. When the polymerization run is performed at a temperature in this range according to the inventive method, the polymerization time can be as short as 3.5 hours or even shorter so that a great improvement can be obtained in the productivity as compared with conventional procedures.

Excepting for the above described essential limitations, the polymerization reaction of the monomer can be conducted under conventional conditions including the proportion of the constituents of the polymerization mixture such as aqueous medium, monomer or monomer mixture, polymerization initiator and dispersing agent as well as the method of introduction of these materials into the polymerization reactor. It is of course optional that the polymerization mixture is admixed with various kinds of known additives according to need including polymerization regulators, chain transfer agents, pH controlling agents, gelation improvers, antistatic agents, crosslinking agents, stabilizers, fillers, antioxidants, buffuring agents, scale-deposition inhibitors and the like.

In the following, the improved method according to the present invention is described in more detail by way of examples and comparative examples which, however, never limit the scope of the invention in any way.

EXAMPLE 1

A stainless steel autoclave with a jacket having a capacity of 2.1 m$^3$ was connected to a shell-and-tube type multitubular heat exchanger of which the heat transfer area was 5.0 m$^2$ wide through a Hydrostal Pump of 24 m$^3$/hour capacity at 7.5 meters head having an inverter-controlled variable flow-rate regulator by using pipes and valves to build a circulation circuit illustrated in FIG. 1 of the accompanying drawing. The maximum heat-removal capacity of the jacket of the reactor was 60 megacalories/hour while that of the heat exchanger was 80 megacalories/hour.

The polymerization reactor was charged with 840 kg of deionized water and an aqueous solution containing 240 g of a partially saponified polyvinyl alcohol and 160 g of a water-soluble cellulose ether as a dispersing agent to form a polymerization medium. After evacuation of the reactor down to a reduced pressure of 50 mmHg, 670 kg of vinyl chloride monomer were introduced into the polymerization medium under agitation followed by the introduction of 2010 g of di-2-ethylhexylperoxy dicarbonate as a polymerization initiator under pressurization using a pump thus to form a polymerization mixture. Along with the start of the pump leading to the heat exchanger for the circulation of the polymerization mixture therethrough at a rate of 390 liters/minute, hot water was circulated through the jacket of the reactor and through the heat exchanger so as to increase the temperature of the polymerization mixture up to the polymerization temperature of 55° C. Circulation of hot water through the jacket and through the heat exchanger was interrupted at a moment when the temperature of the polymerization mixture reached 53.5° C. Immediately after the moment when the temperature of the polymerization mixture reached 55° C., circulation of cooling water was started through the jacket of the reactor to control the temperature of the polymerization mixture along with the start of circulation of cooling water at 30° C. through the heat exchanger at a rate of 10 m$^3$/hour to continue the polymerization reaction at the same temperature. The linear flow velocity of the cooling water through the tubes of the heat exchanger was 1.2 meters/second. The temperature of the cooling water circulated through the jacket of the reactor was 40° C. as measured at the inlet port to the jacket. When the pressure inside of the reactor had dropped to 6.5 kg/cm$^2$G taking 2 hours and 50 minutes, the unreacted monomer was purged out of the reactor and recovered to terminate the polymerization reaction. The polymerizate slurry was discharged out of the reactor and dehydrated and dried in a conventional manner to give a dry polyvinyl chloride resin powder, which was subjected to the evaluation tests for the items described below.

The circulation circuit of the polymerization mixture was disassembled and the inner walls of the pipes, pump and heat exchanger tubes were inspected to find absolutely no deposition of polymer scale retaining the initial metallic luster of the surface.

The above obtained polyvinyl chloride resin powder was subjected to the tests for the following items in the testing procedures described there to give the results shown in Table 1.

Bulk Density

Measurement was undertaken according to the procedure specified in JIS K 6721.

Particle Size Distribution

The resin powder was passed through screens of 60 meshes, 80 meshes, 100 meshes, 150 meshes and 200 meshes per inch as specified in JIS Z 8801 and the respective amounts of the resin powder falling through the screens were recorded in % by weight based on the total amount of the resin powder.

Plasticizer Absorption

A 10 g portion of the resin powder was put into a cylindrical vessel of an aluminum alloy having an inner diameter of 25 mm and depth of 85 mm and bearing a mass of glass fibers on the bottom and then 15 g of dioctyl phthalate were added thereto. After standing for 30 minutes at room temperature as such to cause full absorption of the plasticizer by the resin powder, the cylindrical vessel was subjected to centrifugation at an acceleration of 1500 G so as to separate the unabsorbed plasticizer from the resin powder to record the amount of the absorbed plasticizer in % by weight based on the amount of the dry resin powder.

Number of Fish Eyes

A 50 g portion of a mixture consisting of 100 parts by weight of the resin powder, 50 parts by weight of dioctyl phthalate, 0.5 part by weight of tribasic lead sulfate, 1.5 parts by weight of lead stearate, 0.1 part by weight of titanium dioxide and 0.05 part by weight of carbon black was kneaded for 5 minutes on a 6-inch roller mill at 140° C. and then sheeted into a sheet having a thickness of 0.2 mm and a width of 10 cm, of which the number of translucent spots was counted on an area of 100 cm$^2$ and recorded as the number of fish eyes.

COMPARATIVE EXAMPLE 1

The procedure was substanitally the same as in Example 1 described above excepting replacement of the Hydrostal Pump with a conventional centrifugal pump of 24 ms/hour capacity at 15 meters head. The temperature of the cooling water circulated through the jacket of the reactor was 36° C. at the inlet port. The polymerization reaction was terminated after 2 hours and 50 minutes of running.

A large amount of polymer scale deposition was found by the inspection on the inner walls of the pipes, pump and heat exchanger tubes as disassembled and the pipe was near to blocking at a part by the polymer scale deposition. Table 1 below also shows the results of the evaluation tests for the resin powder obtained in this polymerization run.

COMPARATIVE EXAMPLE 2

The experimental procedure was just the same as in Example 1 except that the external heat exchanger was not operated and the temperature of the cooling water circulated through the reactor jacket was 28° C. at the inlet port. Due to the insufficient cooling capacity by means of the jacket alone, the temperature of the polymerization mixture could not be controlled at and exceeded 55° C. When the temperature of the polymerization mixture reached 60° C. with a conversion of the monomer into polymer of 30%, 2010 g of bisphenol A as a polymerization inhibitor were introduced into the polymerization reactor to terminate the polymerization reaction.

EXAMPLE 2

The experimental procedure was substantially the same as in Example i described above except that the shell-and-tube external heat exchanger was brought into cooling operation for heat removal at the moment when the conversion of the monomer to polymer just reached 10% and the temperature of the cooling water circulated through the jacket of the reactor was 32° C. at the inlet port. The polymerization reaction was terminated after 2 hours and 50 minutes of running. The circulation circuit was disassembled and the inner walls of the pipes, pump and heat exchanger tubes were inspected to find absolutely no deposition of polymer scale retaining the initial metallic luster of the surface. Table 1 below also shows the results of the evaluation tests for the resin powder obtained in this polymerization run.

COMPARATIVE EXAMPLE 3

The experimental procedure was substantially the same as in Example i except that the shell-and-tube external heat exchanger was brought into cooling operation for heat removal at the moment when the conversion of the monomer to polymer just reached 20% and the temperature of the cooling water circulated through the jacket of the reactor was 28° C. at the inlet port. The temperature of the polymerization mixture was about 57° C. at the moment when the external heat exchanger was brought into operation and could be decreased to and stabilized at 55° C. only at a moment 35 minutes thereafter when the conversion of the monomer to polymer was 40%. The polymerization reaction was terminated after 2 hours and 45 minutes of running. The circulation circuit was disassembled and the inner walls of the pipes, pump and heat exchanger tubes were inspected to find a small amount of polymer scale deposition on the surface of the spiral blade of the pump and on the surface of the lower part of each of the heat exchanger tubes. Table 1 below also shows the results of the evaluation tests for the resin powder obtained in this polymerization run.

COMPARATIVE EXAMPLE 4

The experimental procedure was substantially the same as in Example 1 except that the amount of di-2-ethylhexylperoxy dicarbonate was decreased to 737 g, the shell-and-tube external heat exchanger was brought into cooling operation for heat removal at the moment when the conversion of the monomer to polymer just reached 20% and the temperature of the cooling water circulated through the jacket of the reactor was 36° C. at the inlet port. The polymerization reaction was terminated after 4 hours and 30 minutes of running. The circulation circuit was disassembled and the inner walls of the pipes, pump and heat exchanger tubes were inspected to find no polymer scale deposition on any part of the surfaces which retained the initial metallic luster. Table 1 below also shows the results of the evaluation tests for the resin powder obtained in this polymerization run.

TABLE 1

|  | Example 1 | Example 2 | Comparative Example 1 | Comparative Example 3 | Comparative Example 4 |
|---|---|---|---|---|---|
| Yield of resin, % | 83 | 83 | 83 | 83 | 83 |
| Bulk density, g/cm$^3$ | 0.525 | 0.527 | 0.489 | 0.535 | 0.529 |
| Particle size distribution, passing through screen of | | | | | |
| 60 mesh | 100 | 100 | 96.2 | 100 | 100 |
| 80 mesh | 60.8 | 56.7 | 78.5 | 53.5 | 61.3 |
| 100 mesh | 39.6 | 34.5 | 64.3 | 25.3 | 41.3 |
| 150 mesh | 25.1 | 14.5 | 34.2 | 12.3 | 23.4 |
| 200 mesh | 0.8 | 0.6 | 26.8 | 0.5 | 0.5 |
| Plasticizer absorption, % by weight | 22.7 | 22.4 | 26.8 | 19.5 | 22.6 |
| Number of fish eyes | 20 | 16 | 250 | 100 | 20 |

What is claimed is:

1. A method for the preparation of a vinyl chloride-based resin which comprises, in a process in which vinyl chloride monomer or a monomer mixture mainly composed of vinyl chloride is suspension-polymerized in an aqueous medium containing a polymerization initiator and a dispersing agent, providing a polymerization reactor system comprising a polymerization reactor, an external heat exchanger, a pipe line connecting the heat exchanger to a lower part and to an upper part of the polymerization reactor to circulate the polymerization mixture through the heat exchanger during the polymerization reaction to remove the heat of polymerization and providing a pumping means having an impellor in the form of a single spiral screw blade around a hub having a conical configuration to circulate the polymerization mixture from the lower part to the upper part of the reactor through the heat exchanger, and starting removal of the heat of polymerization through the external heat exchanger at or after a moment when the temperature of the polymerization mixture reaches the predetermined polymerization temperature but before the moment when the conversion of the monomer to the polymer exceeds 10%.

* * * * *